(12) United States Patent
Son et al.

(10) Patent No.: US 6,212,408 B1
(45) Date of Patent: Apr. 3, 2001

(54) VOICE COMMAND SYSTEM AND METHOD

(75) Inventors: William Y. Son; Jong T. Chung, both of San Diego; Swan Chen, Cupertino, all of CA (US)

(73) Assignee: Innovative Global Solution, Inc., La Jolla, CA (US)

( * ) Notice: Subject to any disclaimer, the term of this patent is extended or adjusted under 35 U.S.C. 154(b) by 0 days.

(21) Appl. No.: 09/305,099

(22) Filed: May 3, 1999

(51) Int. Cl.[7] ...................................................... H04Q 7/20
(52) U.S. Cl. ........................... 455/563; 455/460; 455/550; 455/564; 455/565; 455/575; 379/88.01; 379/88.02; 379/88.03; 379/355
(58) Field of Search ...................................... 455/564, 550, 455/575, 565, 413, 412, 460; 379/88.01, 88.03, 88.04, 355

(56) References Cited

U.S. PATENT DOCUMENTS

| | | | |
|---|---|---|---|
| 5,222,121 | * | 6/1993 | Shimada ............................ 379/88.03 |
| 5,465,291 | * | 11/1995 | Barrus et al. ........................... 379/67 |
| 5,471,643 | * | 11/1995 | Marui ................................... 455/435 |
| 5,787,152 | * | 7/1998 | Freadman ............................... 379/67 |
| 5,864,603 | * | 1/1999 | Haavisto ............................... 379/355 |
| 5,864,606 | * | 1/1999 | Hanson et al. ...................... 379/88.18 |
| 5,892,813 | * | 4/1999 | Morin et al. ....................... 379/88.01 |
| 5,991,637 | * | 11/1999 | Mack, II et al. .................... 455/550 |
| 6,014,427 | * | 1/2000 | Hanson et al. ...................... 379/67.1 |

* cited by examiner

Primary Examiner—Daniel Hunter
Assistant Examiner—Yemane Woldetatios
(74) Attorney, Agent, or Firm—Lyon & Lyon LLP

(57) ABSTRACT

A system and method for allowing a communication device to accepts voice commands from a user. The voice commands can include commands to execute or dial key sequences or commands to control device functionality. Voice commands are received from a user of the communication device, indicating a command to be carried out by said communication device. The commands are interpreted and executed by the communication device.

50 Claims, 10 Drawing Sheets

VOICE COMMAND SYSTEM AND METHOD

BACKGROUND OF THE INVENTION

1. Field of the Invention

The present invention relates generally to telephonic systems and handsets and more specifically to a system and method for facilitating voice commands with telephone and communication systems.

2. Related Art

The advent of wireless personal communication devices has revolutionized the telecommunications industry. Cordless telephones, as well as Cellular, PCS, emerging satellite networks and other wireless services provide wireless personal communications to businesses and individuals at home, in the office, on the road, and virtually anywhere the wireless network reaches. Wireless telephone subscribers no longer have to stop at pay telephones along the road, or wait until they return home or to the office to check messages and return important business calls. Instead, wireless subscribers carry out their day to day business from their cars, from the job site, while walking along the airport concourse, and just about anywhere their signals are accessible.

Additionally, the popularity of the speakerphone, for both mobile and fixed phones has grown steadily. The speakerphone feature enables users to conduct other tasks while carrying on a conversation without having to hold the instrument to their ear. In the car, the user can drive with preferably with both hands on the wheel and both eyes on the road. At home or in the office, the user can carry on other tasks while also carrying on a conversation.

Thus, it is no surprise that since the introduction of the cellular telephone service, the number of wireless telephone subscribers has increased steadily. Today, the number of wireless telephone subscribers is staggering and still growing rapidly. In fact, many households have multiple wireless telephones in addition to their conventional land-line services. Additionally, the popularity of speakerphones has grown as well. Almost every office telephone includes a speakerphone feature in today's modern workplace.

With markets of this size, there is fierce competition among hardware and equipment manufacturers as well as among service providers. In an attempt to lure customers, most manufacturers and providers offer handsets with desirable features or attributes such as small size, light weight, longer battery life, speed dial, and so forth. Many recent additions to the marketplace include multi-functional handsets that even provide pocket-organizer functions integrated into the wireless handset. Most manufacturers, however, are still scrambling to add new features to their communication devices to snare a portion of this booming market. One disadvantage that exists with many current devices and services, however, is that their hands-free capabilities are somewhat limited. With conventional technology, hands-free operation is limited to speakerphone capabilities that only allow a user to converse in a hands-free mode.

SUMMARY OF THE INVENTION

The present invention is directed toward systems and methods implementing a voice command mode with an electronic device such as, for example a communication device. In one implementation of the invention, a voice command mode is provided with communication hand set or device such as, for example, a telephone, a cordless phone, a wireless handset, a satellite phone, or other communication device. There is methods and techniques can be provided to allow the voice to enter the voice command mode and exit from the voice command mode in a manner that is advantageously beneficial to a user.

According to one aspect to the invention, several techniques can be provided to allow or to cause the communication device to enter into the voice command mode. For example, manual entry may be requested by the user in response to a button activity, such as, for example depressing or manipulating a button or switch, a key stroke, a key sequence, or other manual operation. Additionally, manual entry may be requested by a spoken command that is interpreted as instructing the device to enter the voice command mode.

According to another aspect of the invention, the communication device can be programmed to automatically enter the voice command mode based on the occurrence of certain events or conditions. For example, on the occurrence of an incoming call in the idle mode, the system can automatically enter the voice command mode, allowing the user to provide a voice command indicating whether the device should answer the call, ignore the call, or send the incoming call to voice mail. As another example, the communication device may be programmed to automatically enter the voice command mode upon the initiation of a call to a particular recipient, or upon a receipt of a call from a particular caller. This scenario can be especially useful in situations such as those where the other party to the call is an automated system that utilizes DTMF tones or other signals for operation or navigation. As yet a further example, the communication device can be programmed to automatically enter the voice command mode when connected to a hands-free kit.

Once in the voice command mode, the communication device can interpret one or more voice commands received by the user, and can act on those voice commands. For example, according to one aspect of the invention, the voice command mode can allow the user to vocally request key stroke inputs, and can convert this vocal input into appropriate tones (such as, for example DTMF tones). The communication device can communicate these DTMF tones across the communication channel. In other words, in the voice command mode, the user can, through voice commands, vocally enter a number or alphanumeric sequence without physically having to press the number or sequence on the keypad. The communication device in interpreting these commands, causes the number or sequence to be "dialed."

Thus, in voice command mode, the user can vocally command the communication device to look-up a number for a desired party and to dial that number. Furthermore, the voice command mode can be implemented in scenarios where the user is accessing a menu-driven system such as, for example, voice mail systems, automated account systems, paging systems, and other automated systems. Consider for example using the voice command mode to access a voice mail system. The user can place a call to or receive a call from the voice mail system. Using the voice command mode, the user can enter his or her password information by speaking the password (usually a numeric sequence) instead of pressing the sequence. Additionally, the user can navigate through the voice-mail system options with voice commands as opposed to physical keystroke entries.

The same advantages can be found by accessing other automated systems as well. Thus, in these and other scenarios, the user does not need to constantly remove the handset from his or her ear, enter key strokes, replace the handset to his or her ear, enter another key stroke, and so on. Instead, by interpreting voice instructions, and dialing the sequence for the user, the operation is easier and more convenient for the user.

As with entry into the voice command mode, several techniques and scenarios can be provided for exiting the voice command mode as well. For example, manual exit of the voice command mode can be provided in the form of a physical action performed by the user, or even a voice command provided by the user such as, for example, "exit voice command mode." This manual mode allows the user direct control over when he or she exits the voice command mode.

According to another aspect of the invention, additional techniques can be provided for exiting the voice command mode. These additional techniques can include automatic exiting upon the expiration of a timeout period, upon the receipt of a pre-determined period of silence, and upon the issuance of a certain commands, command sequences, or upon the occurrence of other defined conditions. The provisions for automatically exiting the voice command mode can be implemented to provide a more seamless or transparent operation to the user.

According to yet another aspect of the invention, the operational parameters surrounding the voice command mode can be varied based on a mode of the communication device, the type of command entered, or other parameters.

The term "dialed" as used in this document should not be limited to a strict construction wherein a number or sequence is physically dialed. In stead the term "dial" in its various forms generally refers to causing the appropriate DTMF tone(s) or other signal(s) to be sent to a communication channel or network, and perhaps to an end recipient. Furthermore, for ease of description the invention is at times described in terms of DTMF tones being generated and transmitted. This is provided for illustration purposes only. As would be understood by one of ordinary skill in the art, there are numerous alternatives to and equivalents of DTMF tones. As such, the use of the term DTMF in this document is intended to encompass these alternative and equivalent signaling techniques as well.

These and further features, advantages and aspects of the invention, which can be implemented individually or in various combinations, are described in detail below.

DETAILED DESCRIPTION OF THE PREFERRED EMBODIMENTS

1. Introduction and Overview

The present invention is directed toward a system and method for providing enhanced handset or instrument features in combination with hands-free access. More specifically, according to one aspect of the invention, a hands-free command mode is provided for a communication device, allowing a user to utilize voice commands in place of or in addition to key-stroke entries.

For example, according to one aspect of the invention, a technique can be provided to allow the communication device to enter a voice command mode, wherein the communication device accepts voice commands spoken by the user. The voice commands can be used to perform or direct a number of functions including, for example, the entry of DTMF signals or other keystrokes, or accessing device features. Various techniques can be used to allow the communication device to enter and exit the voice command mode, as well as to recognize different types of voice commands to handle a variety of different situations.

2. Example Environment

Before describing the invention in detail, it is useful to describe a simple example environment in which the invention can be implemented. One such example environment is a telephone environment, or a portable communication handset such as a cordless telephone, cellular phone or other wireless communication device. One particular application of such a device is a wireless communication handset such as, for example, a cellular, GSM, PCS, radio, or other wireless communication handset. Such handsets or communication devices provide wireless communication services and often include a keypad for control and data entry of the device, as well as a display to provide information to the user regarding the communication or regarding information entered by the user on the keypad.

Wireless communication handsets or devices such as those that would benefit from the various features and aspects of the present invention, can be implemented in a number of different configurations with a number of different architectures. In fact, as will become apparent to one of ordinary skill in the art after reading this description, implementation of the features of the present invention is not dependent on a particular or specific architecture of the electronic device or communication device. However, to provide a backdrop for the description of the features, an example wireless communication device is described with reference to FIG. 1.

Figure 1:
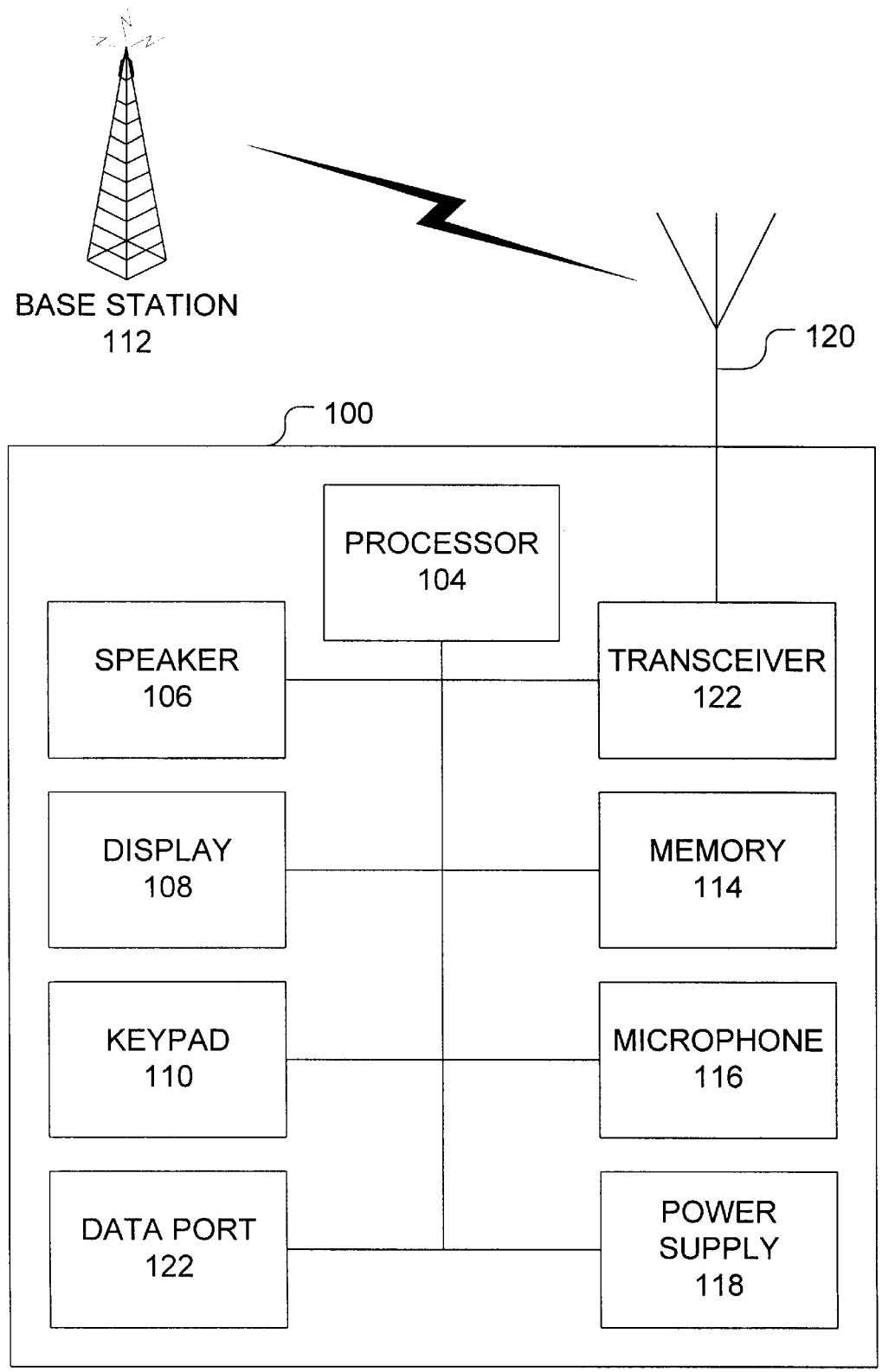
FIG. 1 is a diagram generally illustrating an example environment of the invention as a wireless communication handset.

Referring now to FIG. 1, the wireless communication device 100 includes a processor 104, a speaker 106, a display 108, a keypad 110, a transceiver 112, a memory 114, a microphone 116, a power source 118, a data port 122 and an antennae 120. Wireless communication device 100 can be a handheld handset, integrated vehicle phone or other preferably wireless communication device configured to communicate with other communication devices such as, for example, a base station 112 or other communication device. Contemporary communication handsets typically include one or more processors 104 to control the operation and the features of the handset. Processor 104 typically has associated therewith computer program code running on the processor to carry out the functionality of the device.

Memory 114 such as RAM, ROM, or other memory, can be included and interfaced with the processor to store the program code and to provide other storage space for data or other information useful in executing the program code as well as in carrying out functions of the handset. In fact, the features and functionality of the present invention can be implemented using hardware, software, or a combination thereof, and such software can run on a processor such as processor 104.

Communication handsets 100 typically also include a transceiver 112. Transceiver 112 provides a transmitter to transmit voice and data information via antenna 120 to a recipient communication device such as, for example, base station 112. Transceiver 112 typically also includes a receiver to receive voice and data communication from another communication device (e.g., base station 112) and to provide the received voice and data information to the user or to facilitate internal functionality of the handset. In the case of a cordless telephone, for example, the base station may be the telephone base that is connected via the user's telephone line to a PSTN. As another example, in the case of a cellular phone, base station 112 may be the cell site base station. As yet one more example, in the case of a satellite communication system, base station 112 may include a relay satellite and an earth station associated therewith.

User interface portions of the typical wireless communication handset 100 include a speaker 106, a display 108, a keypad 110, and a microphone 116. Microphone 116 accepts voice or other audio information from the user, converts this information to electrical signals such that they can be transmitted by the transceiver to a recipient. Likewise, speaker 106 converts electrical signals received by transceiver 112 into audio information that can be heard by a user of the wireless communication device 100.

Display 108 can be included and used to display information to the user such as, for example, call information, keypad entry display, signal presence and signal strength display, battery life display, identification of an incoming call, or any other information useful to the user. Display 108 can include any type of display, but is preferably a liquid crystal display (LCD) due to the LCD's low power consumption characteristics. Display 108 can also include other visual displays such as, for example, light emitting diode (LED) indicators or other visual indicators.

Keypad 110 can be implemented using a numeric or an alphanumeric keypad and can also include special function keys. In one embodiment, keypad 110 includes back lighting such that information on the keys can be viewed by the user in low light or dark conditions. Many electronic devices including wireless communication devices include a flip panel (not illustrated) that can be closed to conceal some or all of the keys on the keypad.

Power source 118 is used to provide power to one or more of the components of the wireless communication handset 100. Power source 118 can be implemented, for example, using rechargeable batteries such as NiCad or NiMH rechargeable batteries. Other power sources can be included in addition to or in place of batteries.

Data port 122 can be used to exchange or share data with a host computer or other device. For example, where the functionality of the telephone device includes personal organizer functionality, a user may wish to upload collected contact information to his or her laptop or desktop computer. Data port 122 can be a hard wired or wireless data port and can use any of a number of different communication standards. One such example communication standard prominent in PC interfaces is RS-232. As an additional example, in the case of a cellular telephone, data port 122 may be used to interface a hands-free kit to the handset.

The invention is described herein in terms of this example application in this example environment. Description in these terms is provided for ease of discussion only. After reading the description herein, it will become apparent to one of ordinary skill in the art that the present invention can be implemented in any of a number of different electronic devices or architectures, where it is desirable to implement voice commands.

3. Voice-Command Features

Figure 2:
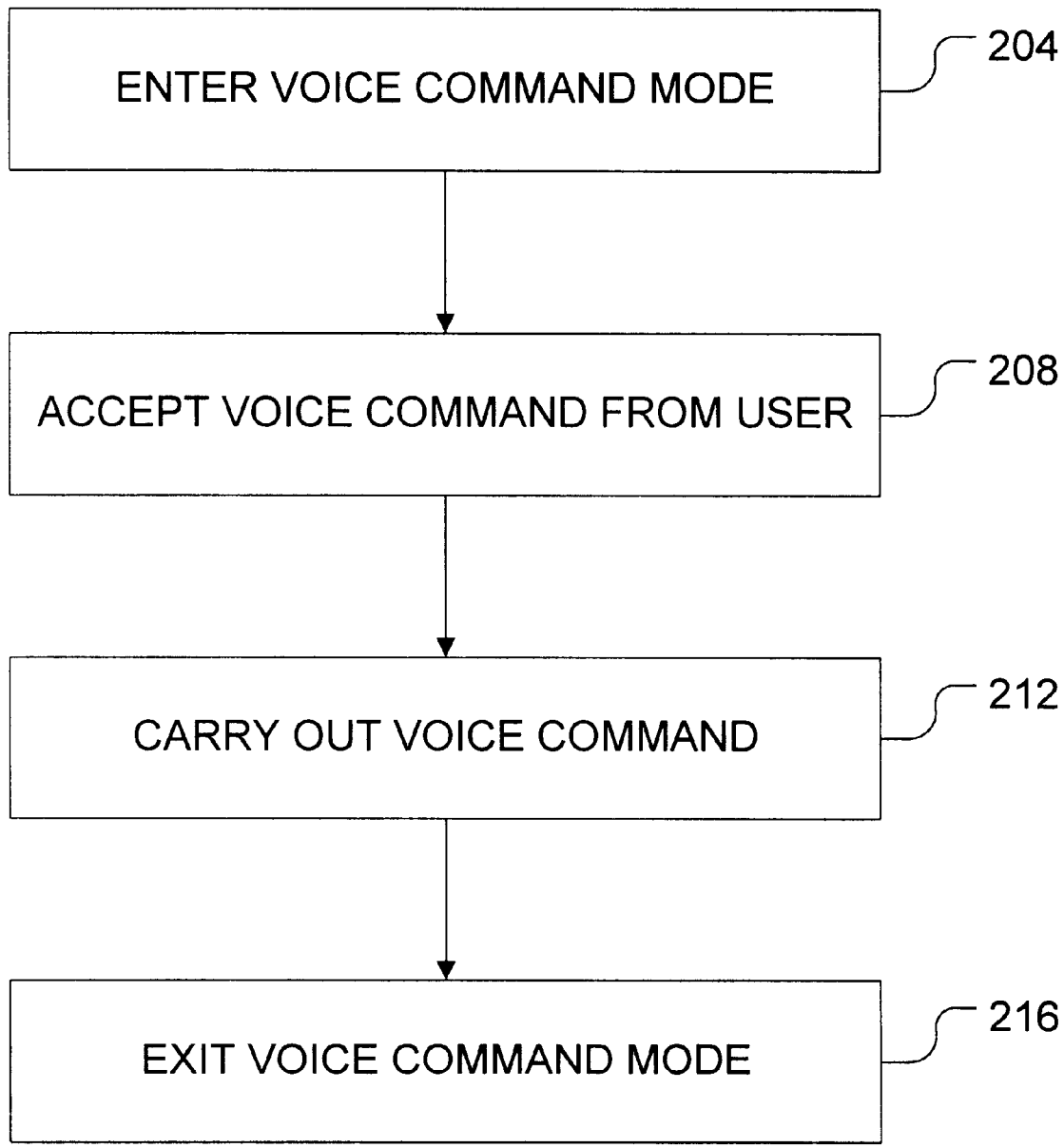
FIG. 2 is an operational flow diagram generally illustrating a process for providing a hands-free command mode or voice command mode according to one embodiment of the invention.

Having thus described an example environment in which the various features and aspects of the invention can be implemented, either individually or collectively, the invention is now described in further detail. FIG. 2 is an operational flow diagram generally illustrating a process for providing a hands-free command mode or voice command mode according to one embodiment of the invention. Again, while the invention is described in terms of an implementation with a wireless handset, it will become apparent to one of ordinary skill in the art after reading this description how the invention can be implemented in alternative applications or implementations.

Referring now to FIG. 2, in a step 204, the communication device enters the voice command mode. Several techniques can be utilized to allow the device to enter the voice command mode including, for example, a button or keypad entry allowing user-directed entry into the voice command mode; recognition of a specific command word or phrase that directs the communication device to enter the voice command mode; entry of the voice command mode in response to the occurrence of an event or events, upon which the device may have been programmed to enter voice command mode; or other alternative techniques or scenarios allowing or directing the communication device to enter the voice command mode.

In one embodiment, an audible or visual indicator can be provided to the user that the communication device has entered the voice command mode. For example, in one embodiment this indicator can be implemented to provide a simple 'beep' to the user upon entry of the voice command mode. Alternative examples can include flashing an LED, flashing the keypad or display backlights, providing an alphanumeric or graphical indication on the display, a spoken indication (e.g., through voice synthesis or playback of recorded voice) to the user, and so on.

In a step 208, once in the voice command mode, the communication device accepts the voice commands from the user. Accordingly, a speech recognizer or interpreter such as, for example, speech recognition software, can be included to recognize and interpret the voice commands provided by the user. In one embodiment, the range or number of commands accepted by the system can be limited in number. Limitation such as in this embodiment allows simplification of the speech recognition portion of the invention.

As described in detail below, sample voice commands that may be included in an example implementation can include voice commands for standard keypad entries, as well as voice commands to operate the communication device and its features. For example, commands for operation of the device may include commands to answer or ignore an incoming call; commands to dial an outgoing call, commands to adjust the volume at the handset or of the speaker; commands to access a directory, calendar, or other feature within the phone; and so on. Commands for standard keypad entry can include, for example, voice commands to "dial" or effectively depress certain keys or key sequences, resulting in the generation of the corresponding DTMF tones. Key sequence commands can also be used for local control of the communication device, and in this scenario do not need to result in generation of DTMF tones.

In the step 212, the communication device carries out the command provided by the user. This can include interpretation of a command type as well as interpretation of the specific command given. As an example of command type, the communication device may recognize two types of commands: keystroke entry commands; and phone feature commands; although others are possible. Thus, in this example, the handset may determine whether the user is entering a command of the type that will generate DTMF tones, or of a type that will adjust a function or feature of the telephone. Carrying this example further, if the command is interpreted as a DTMF type command, the communication device can interpret the speech patterns of the user as one or more of the several keypad buttons and may generate the appropriate DTMF tone or tones accordingly.

In accepting and carrying out a voice command, the command received by the communication device may be echoed back to the user for verification. In one embodiment, the echo and verification can be a mandatory step in that the command is not executed unless the echoed command is verified or approved by the user. Alternatively, the echo can be provided merely as a confirmation or indication of the command the communication device is following.

In a step 216, the communication device exits the voice command mode. As described in detail below, numerous different techniques can be implemented for allowing the device to exit the voice command mode at an appropriate time or upon the occurrence of appropriate events. For example, the communication device may be programmed to exit the voice command mode after a predetermined timeout period, upon detecting a predetermined amount of silence, upon manually being turned off or terminated by the user, or upon the occurrence of other events to which the device was programmed to respond accordingly.

As stated above, there can be various techniques or devices included according to one or more aspects of the invention to allow a communication device to enter and exit the voice command mode. These various techniques can be utilized individually or collectively to allow versatility in the application of the voice command mode. Additionally, the various techniques can be selected and implemented in accordance with a mode of operation of the communication device to enhance the user friendliness or user operability of the system.

First discussed in this regard are techniques for allowing or directing the handset to enter the voice command mode. According to one implementation of the invention, a manual switch or button, or series of keystrokes can be provided to allow the user to manually request that the communication device enter the voice command mode. For example, a button or key can be provided on the keypad or elsewhere on the communication device that, when depressed, causes, the communication device to enter the voice command mode. In one preferred embodiment, a special-purpose, limited-purpose, or even multi-function button can be positioned in proximity with a location where the user's index finger or thumb generally rests when using the communication device. In one example implementation, simultaneous depression of both up and down volume keys causes entry into the voice command mode. Other locations can be chosen as well. In this embodiment, the user can direct the communication device to enter the voice command mode with the press of a button, even while he or she is holding the communication device up to his or her ear.

This 'pushbutton' embodiment may be attractive or desirable in situations where the user is accessing a menu-driven system such as a voice mail system, account information system, menu driven phone system, or other like system. In this scenario, the user can listen for prompts on the handset requesting, for example, the user to enter his or her password information. Without removing the phone from his or her ear to look at the keypad, the user can simply press the voice command activation button, speak his or her password into the microphone of the communication device, and have the device generate the appropriate DTMF tones to enter his or her password into the system. Thus, in this embodiment and in this scenario, the user does not have to continually remove the phone from his or her ear to enter instructions such as passwords, message requests, message forwarding, or other voice mail commands, in accessing the system.

Additionally, in an alternative embodiment, the voice recognition process can continually run in the background waiting for the recognition of a specific voice command. Upon receipt of this specific voice command, the phone may enter the voice command mode without requiring the user to depress a particular key or key sequence. For example, the system may be programmed to interpret a special access word as the command to enter the voice command mode. In this scenario, the communication device may be programmed to "listen for" the special command word in the user's speech. Upon receiving and interpreting this special command word, the communication device can enter the voice command mode allowing specific voice commands to be accepted by the communication device and acted upon.

In one further embodiment of this example, the special code word can be selected by the user as his or her personal code word to enter the voice command mode. In this manner, the user can select a word that is unlikely to come up during conversation, such as, for example, "Abercrombie." Although any word can be selected in this embodiment, choosing a word unlikely to come up in conversation can help to avoid unintentional entry by the communication device into the voice command mode.

As briefly introduced above, the voice command mode can also be entered in one embodiment upon the detection of the occurrence of one or more events. For example, the communication device may be programmed to enter the voice command mode when the device is idle and an incoming call is detected. Following this example further, when an incoming call is detected by the device and the device is in the idle mode, the device can automatically enable some or all of the portions of the voice command mode to interpret vocal commands from the user regarding treatment of the incoming call.

For example, the voice commands that may be included can be a command to answer the call, ignore the call, send the call to voice mail, or provide an identification of the caller placing the incoming call. In this latter example, a voice synthesizer may be included with the communication device to allow the device to vocally identify the incoming caller. In this manner, it is possible for the communication device to allow incoming calls to be handled without physical intervention by the user.

As yet another example, the communication device may be programmed to detect a signal such as a specific DTMF tone or DTMF tone sequence from the other party with whom the call is connected, and upon detection of this tone or tones, automatically enter the voice command mode. For example, a voice mail system may be programmed to generate a particular tone or tones or other signal when user input is required. (Such as, for example, when the user is required to enter password to access a voice mail account). Upon receipt of this tone or tones, the communication device can automatically enter the voice command mode, allowing the user to enter his or her password without needing to access the keypad.

As yet another example, the communication device may be programmed to automatically enter the voice command mode upon dialing of a predetermined phone number. For example, when a user accesses his or her voice mail system from out of the office, it is typical that the user has to enter one or more key sequences to access his or her account, play back messages, forward messages, delete messages and perform other voice mail operations. As such, the communication device can be programmed to automatically enter the voice command mode when the user's voice mail access number is dialed. In one embodiment, numbers for which the user would like the voice command to automatically be activated can be stored in memory with the communication device. More specifically, in one embodiment, for devices that have built-in phone directories or speed dial directories or other number-memory features, a field can be provided within this data set to indicate which of those numbers should have an automatic voice command activation feature associated therewith.

As yet another example, the communication device may be programmed to automatically enter the voice command mode when connected to a hands-free kit, or when activated in a speakerphone mode. Thus, in this scenario, the communication device can, for example, access a directory, dial a selected party, or perform other functions in the voice command mode.

As the above examples illustrate, there are certain situations where it may be important or desirable for the communication device to exit the voice command mode, such that the user can speak to the other party or parties in a telephone conversation. For example, in the voice mail scenarios discussed above, the user may wish to exit the voice command mode and reply to a voice mail message, introduce a forwarded message, or send his or her own voice mail message or messages to other recipients. As another example, where the voice-command mode is used to screen and answer an incoming call, it is desired that the communication device exit the voice-command mode so the user can converse with the caller. As yet another example, where the caller enters the voice command mode during a call to adjust the volume, it is desirable to exit the voice command mode, allowing the caller to return to the call. As a further example, where the voice command mode is used to access a number from a directory and dial that number, it is desirable to exit the voice command mode after the number is dialed.

Figure 3:
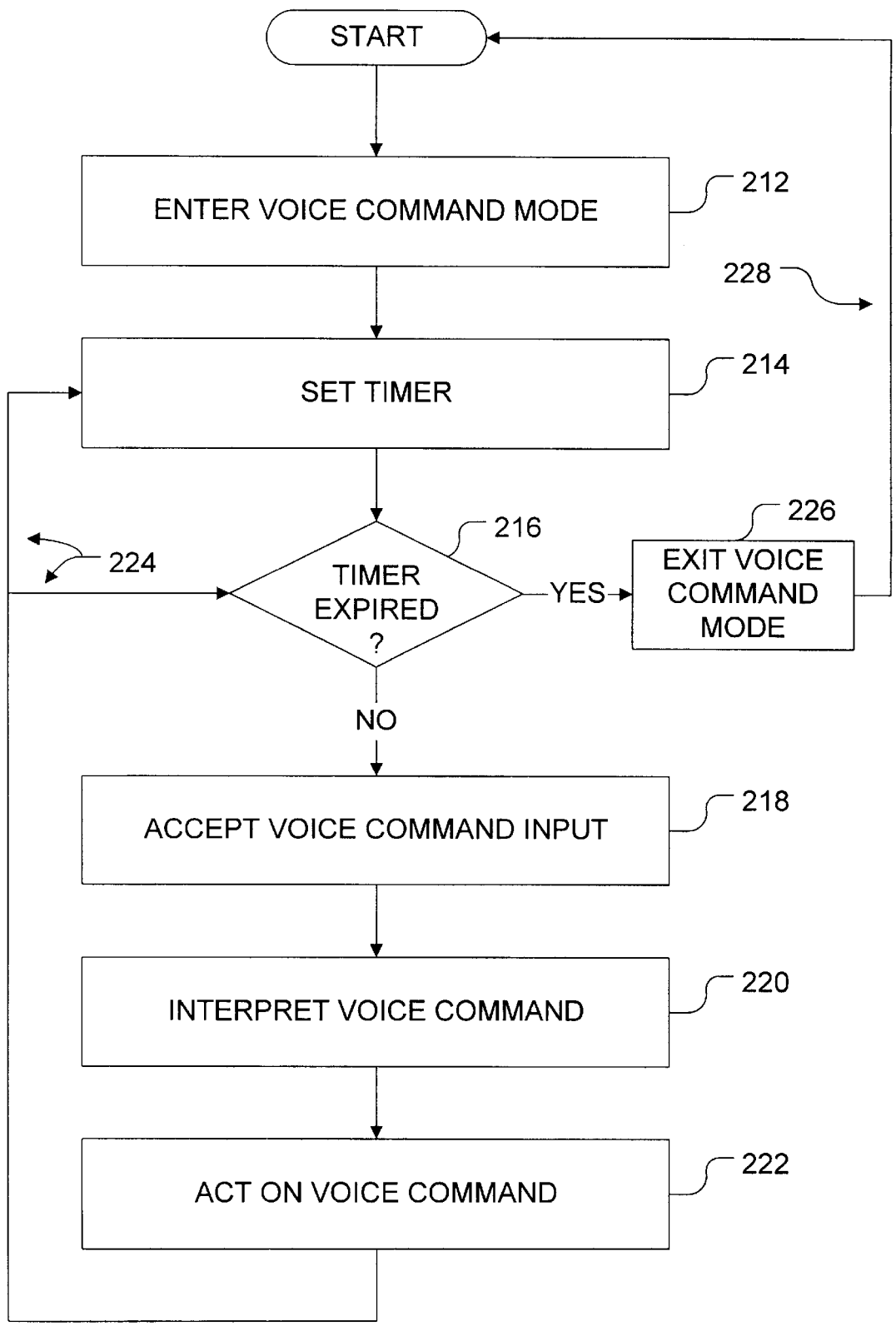
FIG. 3 is an operational flow diagram illustrating a process for utilizing a timer to automatically exit the voice command mode according to one embodiment of the invention.

As these scenarios and examples illustrate, it is desirable that the communication device be configured to appropriately exit the voice command mode. Various manual or automatic techniques that can be implemented to exit the voice command mode are now described. As stated above, in one embodiment, a timer can be used to establish and track a timeout period after which the voice command mode is automatically exited. FIG. 3 is an operational flow diagram illustrating a process for utilizing a timer to automatically exit the voice command mode according to one embodiment of the invention. Referring now to FIG. 3, in a step 212, the communication device enters the voice command mode. The voice command mode can be entered by any of a number of different scenarios, some of which are described above.

In a step 214, upon entry of the voice command mode, the communication device sets a timer to begin counting a timeout period for exiting the voice command mode. The timer can be programmed to count down a predetermined period of time, after which voice command mode is automatically exited. In one embodiment, the time can be user programmable such that a user can program the timer based on his or own user preferences. In another embodiment, the timer can be pre-programmed by a manufacturer or supplier of the communication devices such that the user does not need to perform the programming steps.

In yet another alternative, the timer can be "trained" based on user activities. For example, where a manual on/off feature is provided, the communication device may measure the length of time that the user manually keeps the voice command mode activated. These times can be used as a basis for programming the timer for the timeout period.

As long as the timer has not expired, the communication device can remain in the voice command mode, can accept voice command inputs from the user, interpret these commands, and carry out these commands. This is illustrated by steps 216, 218, 220, and 222. As indicated by the alternative paths illustrated for flow line 224, the communication device can be programmed to reset the timer after each command input, or to continue counting down the previously set timer to a maximum timeout period.

In one embodiment, the choice of whether to reset the timer after each command, or to exit the voice command mode after each command, can be made based on the type of commands being entered, or the phone number to which the caller is connected. For example, if the commands being entered are voice commands that are to be interpreted as DTMF tones, the system may be programmed to assume that subsequent voice commands will be entered. As such, in this embodiment, it may be conceivable that the communication device is programmed to reset the timer after each voice command input. As a more specific example, when a user accesses his or her voice mail account, the system may reset the timer after each entry because it is anticipated that the user will be entering additional key sequences via voice command.

Alternatively, where the user enters the voice command mode during a normal phone call (for example, to adjust the handset volume), it is reasonable for the communication device to anticipate that the user would desire to exit the voice command mode and thus would not reset the timer after acting on the command in step 222. In either case, as long as further voice inputs are provided before the timeout period expires, the communication device can continue to interpret these commands and act on them as illustrated in FIG. 3. Once the timeout period has expired, the communication device exits the voice command mode as illustrated in a step 226. The operation continues at the beginning of the process where the communication device again waits to enter the voice command mode. This is illustrated by flow line 228.

Figure 4:
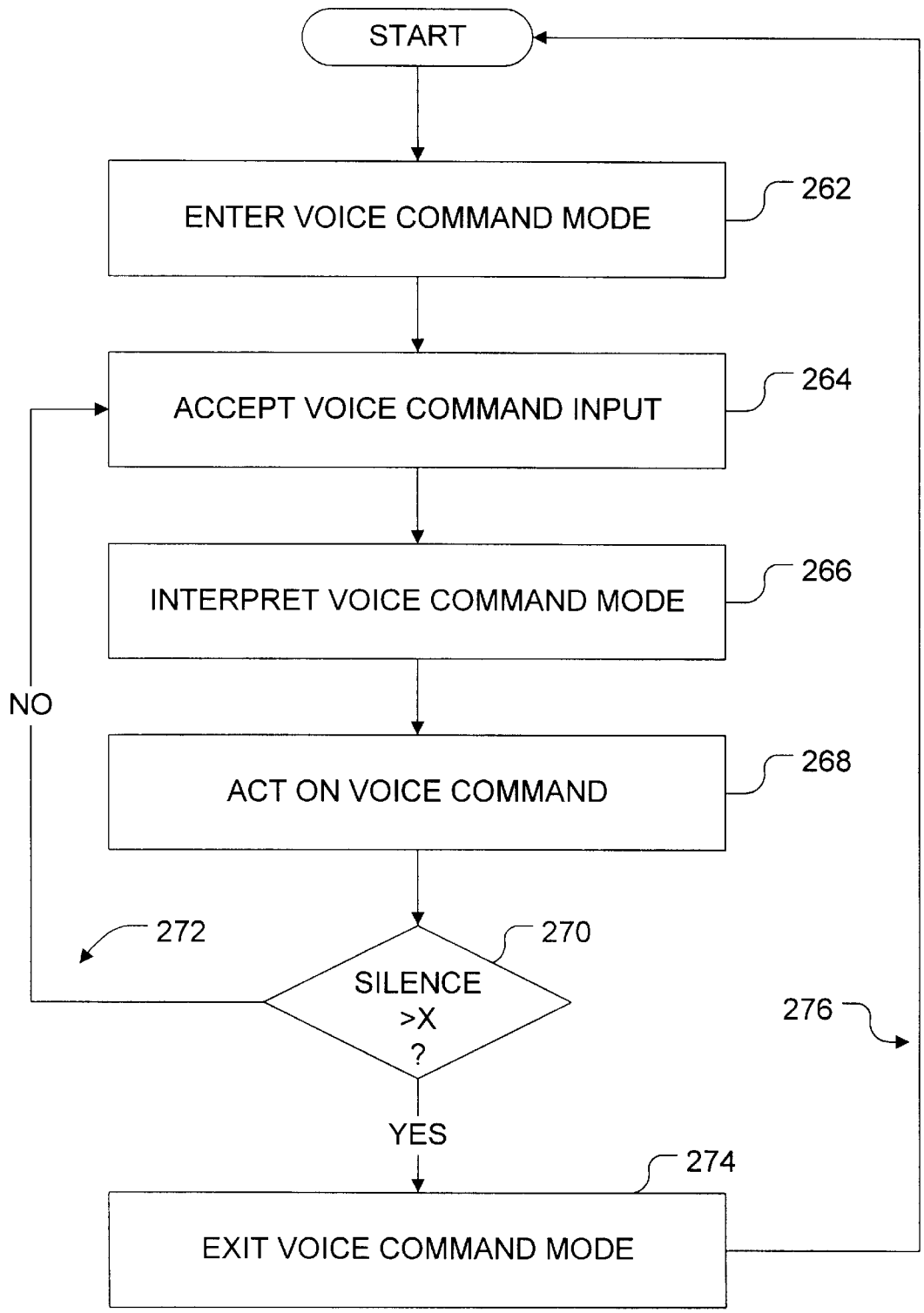
FIG. 4 is an operational flow diagram illustrating a process for exiting the voice command mode upon an elapsed period of silence according to one embodiment of the invention.

As will become apparent to one of ordinary skill in the art after reading this description, one or more timers can be implemented as described above with reference to FIG. 3, or in alternative scenarios or configurations depending on the functionality desired for the device. For example, a timer can also be used to time a period of silence to thereby determine when to exit the voice command mode. FIG. 4 is an operational flow diagram illustrating a process for exiting the voice command mode upon an elapsed period of silence according to one embodiment of the invention.

Referring now to FIG. 4, in a step 262, the communication device enters the voice command mode. In a step 264, in the voice command mode the communication device accepts voice command inputs from the user. The communication device continues to interpret and act on these voice command modes until the user has remained silent for a given period of time. This is illustrated by steps 264, 266, 268, and 270. As long as the user does not remain silent for the predetermined time period, the communication device continues to accept user input as illustrated by flow line 272. If, on the other hand, the user remains silent for greater than the timeout period, the voice command mode is exited as illustrated by step 274, and the operation can begin again as illustrated by flow line 276.

In yet another alternative, the entry and exit of the command mode can be controlled manually by the user. For example, in an implementation where a button or keystroke sequence is utilized to enter the voice command mode, the same button or another sequence can be utilized to exit the voice command mode. For example, the user may depress a specified button and leave that button depressed while he or she wishes to stay in the voice command mode. Releasing that button, then, in this scenario, causes the communication device to exit the voice command mode. In another embodiment, the button may be a "one-touch" button wherein pressing the button once causes the communication device to enter the voice command mode and pressing the button again causes the device to exit the voice command mode.

Figure 5:
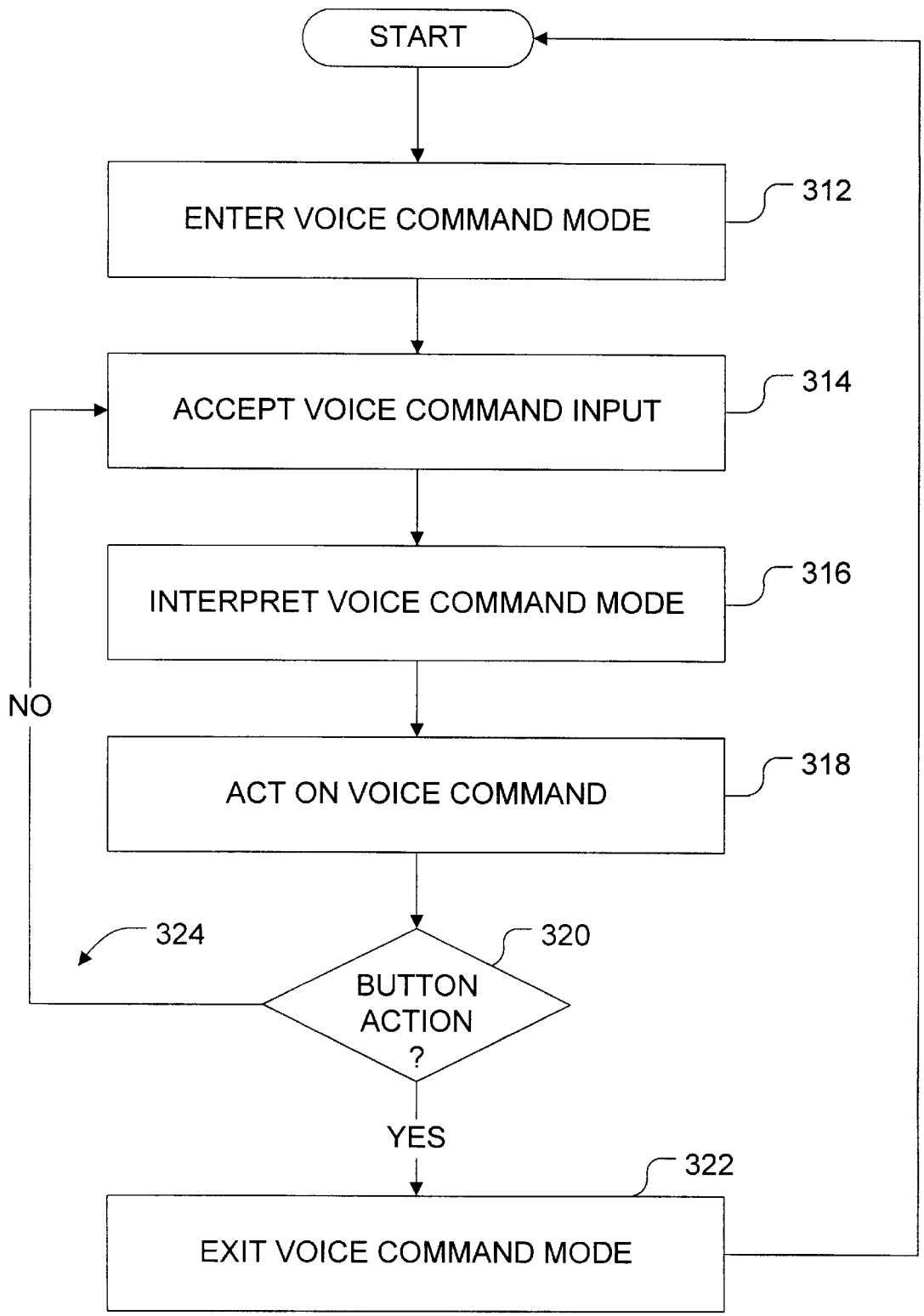
FIG. 5 is an operational flow diagram illustrating a process for manually exiting the voice command mode according to one embodiment of the invention.

FIG. 5 is an operational flow diagram illustrating a process for manually exiting the voice command mode according to one embodiment of the invention. Referring now to FIG. 5, in a step 312, the communication device enters the voice command mode. This mode can be entered manually or automatically according to the various embodiments and scenarios discussed above. Once in the voice command mode, the communication device can accept, interpret and act on voice commands received by the user as illustrated by steps 314, 316 and 318.

If the user depresses the button again in one embodiment, releases the button in another embodiment (or carries out some other pre-determined manual action), the communication device exits the voice command mode as illustrated by steps 320 and 322. In a fully manual mode, the device remains the voice communication mode until the occurrence of this event as illustrated by flow line 324. Of course, this manual mode can be combined with either of the timers discussed above with reference to FIGS. 3 and 4 to provide additional enhancements and features with the invention.

Figure 6:
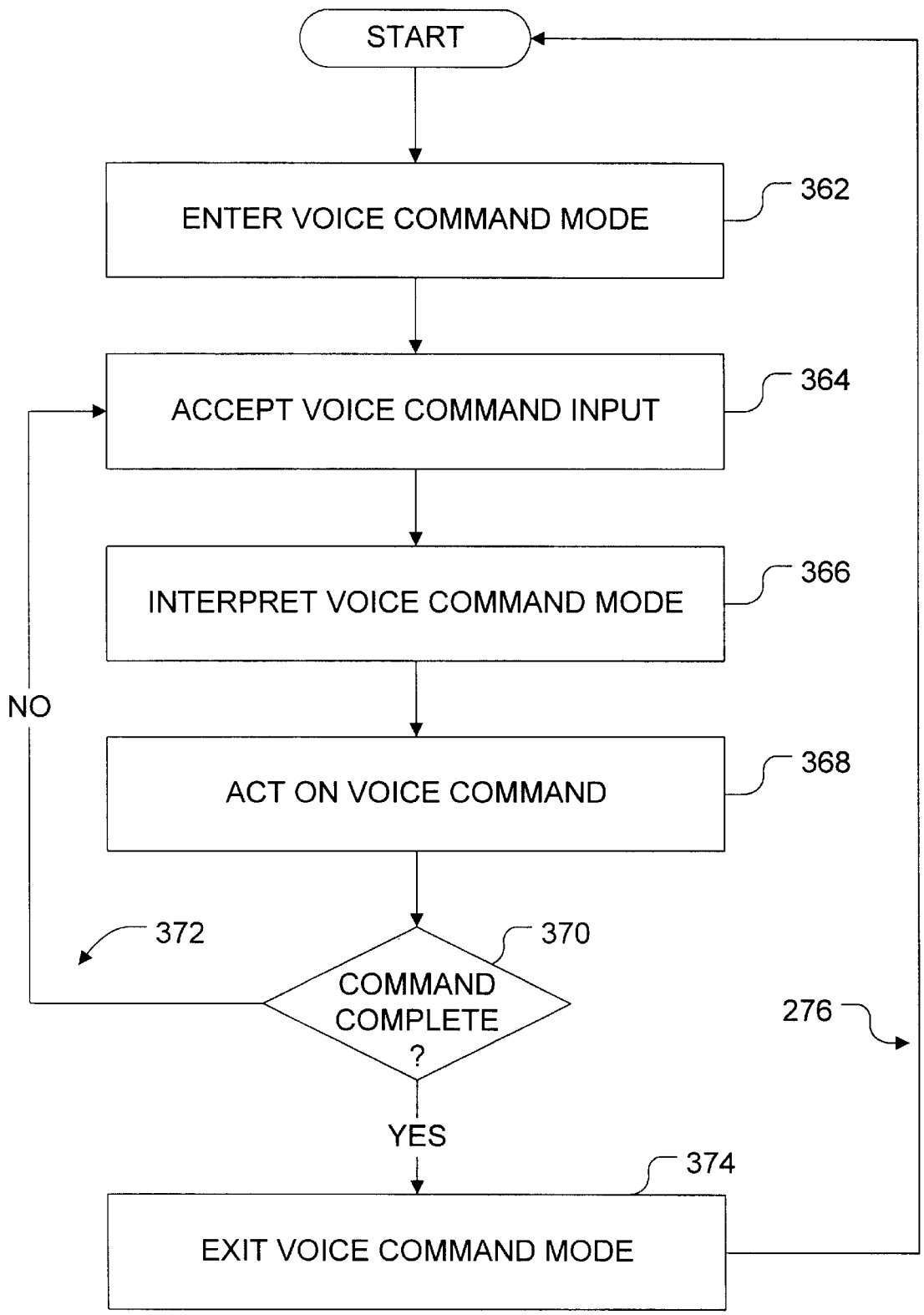
FIG. 6 is an operational flow diagram illustrating a process for automatically exiting the voice command mode upon the completion of a discreet command or command sequence according to one embodiment of the invention.

In yet another alternative embodiment, the communication device can be programmed to exit the voice command mode upon the completion of a discreet command or command sequence. FIG. 6 is an operational flow diagram illustrating a process for automatically exiting the voice command mode upon the completion of a discreet command or command sequence according to one embodiment of the invention. Referring now to FIG. 6, in a step 362, the communication device enters the voice command mode. Voice commands are accepted, interpreted and acted upon in the voice command mode as illustrated by steps 364 and 366.

The communication device can determine whether the command or command sequence is complete and exit the voice command mode as illustrated by steps 370 and 374, or can continue accepting voice input as illustrated by flow line 372. For example, consider a scenario where the handset is in the idle mode, receives an incoming call, and enters the voice command mode. In this scenario, the voice command mode can allow the user to vocally provide instructions as to whether to answer the phone. If the user commands the phone to "answer" the call, the communication device can determine that the command or a series of commands is complete and that the voice command mode can be exited so the user can carry on a conversation with the caller.

However, consider another scenario, where instead of answering the call, user instead asks the communication device to first identify the caller. In this case, the communication device is expecting another command, for example, whether to answer the call, ignore the call, or put the caller through to voice mail. As such, the command sequence can be thought of as not complete, and the communication device, if programmed to do so, will not exit the voice command mode.

Additionally, the communication device may be programmed to exit the voice command mode on the occurrence of certain pre-defined or anticipated events. For example, continuing with the voice mail system example, the communication device may be programmed to exit out of the voice command mode upon the receipt of certain voice commands in a given operational environment.

This can best be described by way of a specific example. Suppose in this specific example, that the user is placing a phone call to his or her voice mail system. In one embodiment, the communication device is programmed to automatically enter the voice command mode when the voice mail system telephone number is dialed. In this example, the communication device is programmed to exit the voice command mode when certain voice mail commands are entered by the user.

For example, in accessing his or her voice mail system the user may dial the number, and in the voice command mode select his or her voice mail box, enter his or her password, and begin play back and deletion and saving of messages. In one embodiment, the communication device can be programmed to exit the voice command mode when the user enters a command such as, for example, a "6" to forward a message, or an "8" to reply to a message. As a result, an introduction to the forwarded message or a reply to the original message can be provided by the user.

At the conclusion of the introduction or the reply, the communication device can once again enter the voice command mode to allow the user with touch-free voice command navigation through the voice mail system. In one embodiment, exiting the voice conversation mode and returning back to the voice command mode at the conclusion of an introduction or reply can be made based on timers, silence detection, manual intervention, or other techniques. Alternatively, the communication device can be programmed to remain out of the voice command mode, until the user request that the device return to the voice command mode.

In the above-described voice-mail system example, the communication device can determine that it is entering a voice-mail system, and utilize this fact in determining which command or series of commands may trigger a temporary or permanent exit from the voice-command mode. Thus, alternative scenarios can be envisioned and accounted for in developing entry and exit triggers for the voice-command mode. As indicated by the above example, the strategies can be based on a system being accessed, a number dialed, or generally implemented for a range of alternative situations.

As yet another example, a communication device can be programmed to exit the voice command mode upon completion of a dial command or sequence of dial commands. More particularly, a caller may use voice command mode to access a number in a directory and to call that accessed number. The communication device can be programmed to exit the voice command mode when the number is dialed so that the caller can engage in a conversation with the called party. In one implementation, the communication device can also determine whether the number dialed is a voice mail or other automated account, and if so, remain in the voice command mode (for example, at least until the caller has vocally entered his password).

As will be understood by one of ordinary skill in the art after reading the above scenarios and descriptions, the techniques described above for exiting the command mode can be implemented independently or in various combinations to achieve the desired functionality. Additionally, it can be appreciated that the various techniques for exiting the command mode can be chosen selectively based on any of a number of parameters such as: a mode that the communication device is in (e.g., idle mode, conversation mode, and so on); a number being called or from which the call originated (e.g., voice mail number, account access number, and so on); the type of command being accessed (e.g., DTMF, feature command, and so on), or other operational parameters that may be present. In providing such flexibility, maximal advantage of the features can be utilized. Furthermore, the implementation and configuration of the various features and aspects of the invention described above can also be implemented in different configurations based on these same factors and parameters.

Figure 7:
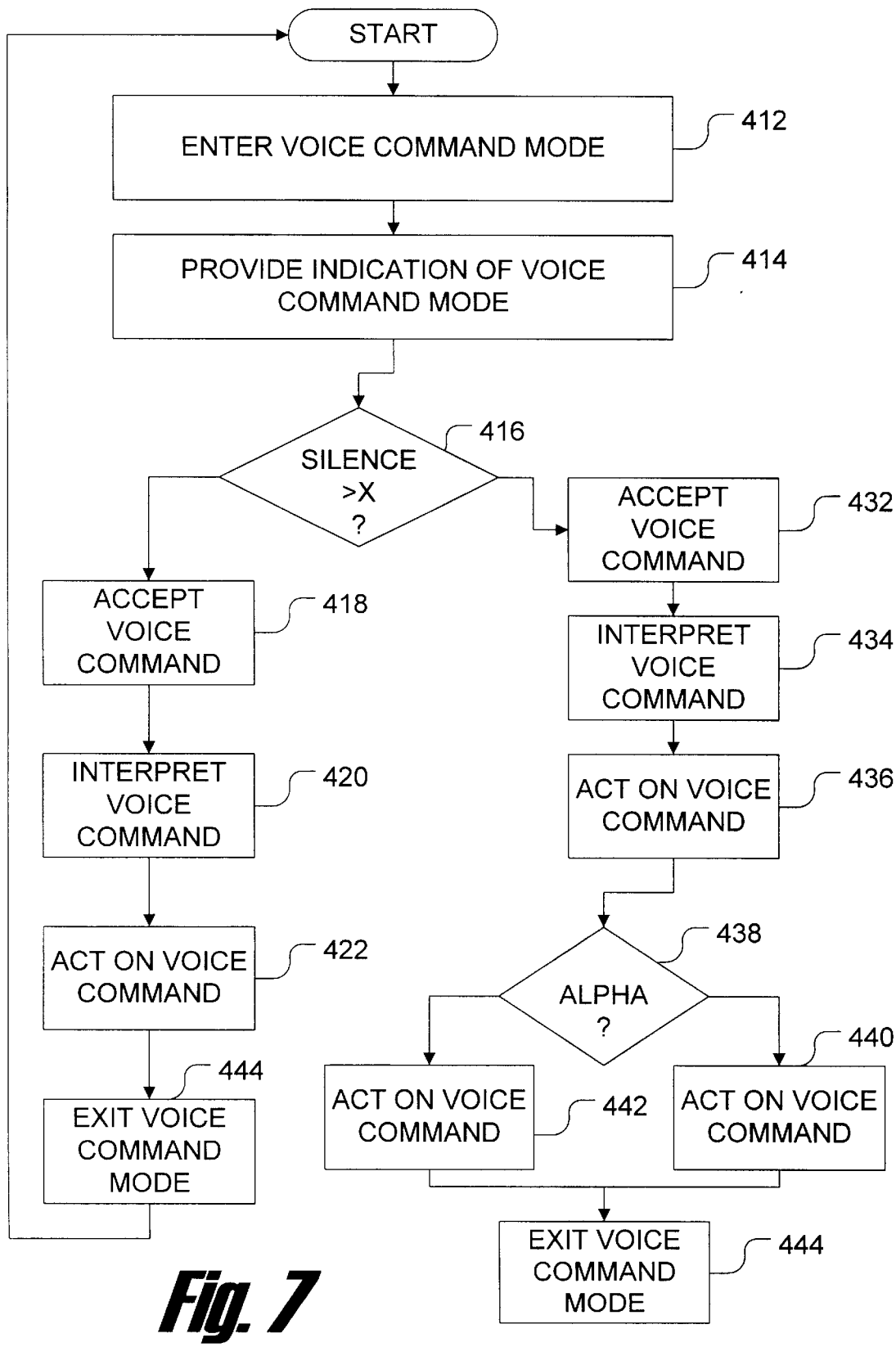
FIG. 7 is an operational flow diagram illustrating a process for providing a voice command mode in alternative configurations depending on whether the communication handset is in the idle mode or the conversation mode according to one embodiment of the invention.

Now described are example operational processes that further illustrate implementation of configurations based on such parameters. FIG. 7 is an operational flow diagram illustrating a process for providing a voice command mode in alternative configurations depending on whether the communication handset is in the idle mode or the conversation mode according to one embodiment of the invention.

Referring now to FIG. 7, in a step 412 the communication device enters the voice command mode. In one embodiment, the communication device can provide an indication to the caller that it has entered the voice command mode. In a step 414, this indication can be a special tone played to the caller via the device speaker, or a visual indication such as a flashing LED or indication on the device display, or a combination of the above indications.

In a step 416, the communication device determines whether it is configured in the idle mode or the conversation mode. In the example embodiment illustrated in FIG. 7, determination of whether the phone is in the idle mode or in the conversation mode to some extent dictates the operation of the voice command mode. As would be apparent to one of ordinary skill in the art after reading this description and as also discussed other places in this document, alternative distinctions (e.g., other operational modes and so on) can be used to dictate or define the operation of the voice command mode.

If the phone is in the idle mode when the voice command is entered, in the illustrated embodiment the voice command mode determines that DTMF is not required. For example, the communication device can be programmed to except limited range of commands in the idle mode such as, answer or identify an incoming call. In one embodiment, it is not anticipated that the commands entered in the idle mode will require DTMF tone generation. Thus, as illustrated by steps 418, 420, 422 and 424, in the idle mode the voice command mode simply accepts the voice command, interprets the voice command, acts on the voice command and exits the voice command mode.

Although not illustrated in FIG. 7, a scenario is possible where the communication device may transition from the idle mode to the conversation mode. One example of this is where a command that the communication device place a new call or that the communication device answer and incoming call is given. In the case of answering an incoming call, the voice command mode is preferably automatically exited upon the answering of a call and the operation returns to the top of FIG. 7 where the device waits for the command to enter the voice command mode.

In the alternative situation where the voice command instructs the communication device to place a new call, the communication device can remain in the voice command mode, such that the user can use the voice command features to instruct the communication device to dial the desired phone number. In this embodiment, it is preferred that the communication device transition from the idle mode to the conversion mode upon the receipt of such command, and that the device exit voice mode once the number is dialed.

Turning now to the conversation mode, in a preferred embodiment when the voice command mode is entered while the communication device is in the conversation mode, the user's voice is masked from the phone call as illustrated by step 432. That is, the user's voice is accepted by the communication device as a voice command and interpreted by the communication device as illustrated in steps 434 and 436. The masking can ensure that the user's voice is not transmitted to the other party or parties to the communication.

In the example embodiment illustrated in FIG. 7, the system determines whether the voice command entered is an alphanumeric command. If so, DTMF tones are generated in response to the alphanumeric command. This is illustrated by steps 438 and 440. If, on the other hand, the system determines that alphanumeric commands are not entered, the commands are interpreted to perform a function or accesses a feature of the communication device during the conversation. As such, as illustrated by steps 438 and 442, the requested function is preformed in response to the command. As an example, the user may have difficulty hearing another party in a conversation, and the user enters the command mode to request an increase in volume of the speaker.

As illustrated by step 444, the system can exit the voice command mode and return to the standard voice mode. The method or technique for exiting can be accomplished using a number of techniques, including the many embodiments described above.

The example embodiment illustrated in FIG. 7 illustrates an example implementation that determines whether a command is an alphanumeric command or a function command. In one embodiment, the system can be programmed to assume that if the voice command mode is entered during a conversation mode, that the commands will be alphanumeric commands and that DTMF tones are to be generated in response thereto. While this can simplify the software, it can also result in fewer features available to the user.

Figure 8:
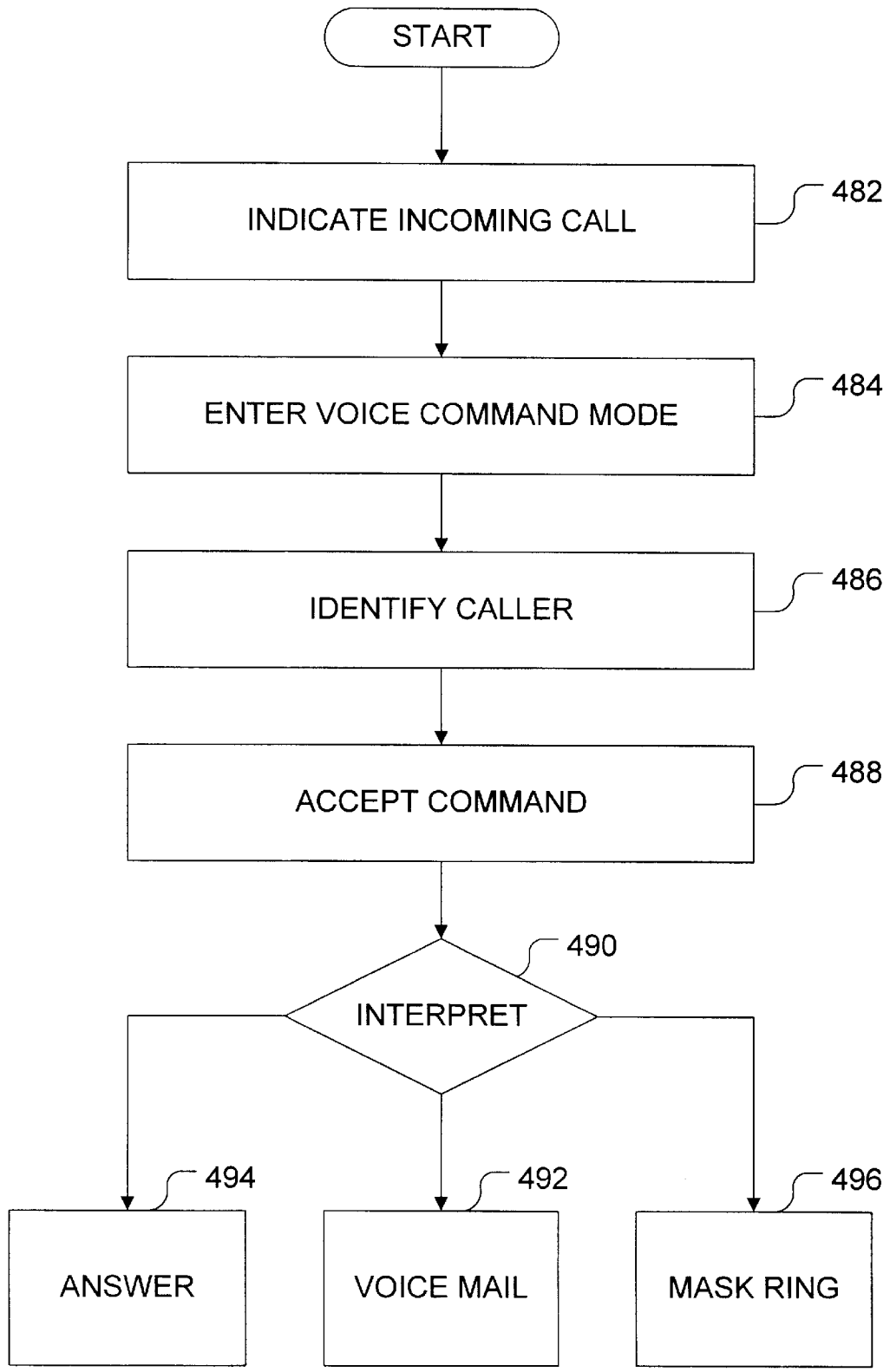
FIG. 8 is an operational flow diagram illustrating a process for implementing a voice command mode for an incoming call in accordance with one embodiment of the invention.

As another example of operational differentiation depending on a mode or depending on the circumstances surrounding entry of the voice command mode, consider a scenario wherein the voice command mode is entered in response to an incoming call. FIG. 8 is an operational flow diagram illustrating a process for implementing a voice command mode for an incoming call in accordance with one embodiment of the invention. In step 482, upon receipt of a call, the communication device indicates that a call is incoming. This can be accomplished using an audible or visual indicator, a vibrator, or other indication techniques.

In step 484, the communication device enters the voice command mode. In one embodiment as described above, the communication device can automatically enter the voice command mode upon the receipt of an incoming call in the idle mode. In step 486, the communication device identifies the caller. The identification of the caller can be provided using a caller i.d. type of display, or can be an audible indication of the caller using voice synthesis techniques. In one embodiment, the identification can be performed automatically, without requiring user intervention or a specific request by the user.

In another embodiment, the communication device can enter the voice command mode and wait for the voice command of the user to ask the communication device to either identify the call, or answer the call. Thus, in step 488, the communication device accepts the command. The command is interpreted, and in one example embodiment, the possible acceptable commands are answer, ignore, or send to voice mail. Thus, the interpretation and the results are illustrated in steps 490, 492, 494 and, 496.

As described above with reference to FIG. 7, in answering a call, the phone can revert back to a standard mode, or remain in voice command mode. In one embodiment, the choice to remain in voice command mode can be made based on identification of the incoming caller. If, for example, the user receives phone calls from an automated system (EG a paging system, voice mail system, or other automated system), the identification of such systems can be provided to the communication device. The communication device can remain in the voice command mode such that the user can enter voice commands (EG menu choices) to navigate through the options provided by the incoming call from the automated system. Alternatively, if there is no indication, the communication device can be programmed to assume the income caller is a conventional voice caller and that the voice command mode can be exited so the user can converse with the caller. Thus, the above examples generally illustrate situations in which the system can be configured to perform differently based on a mode of the phone or a type of command entered by a caller.

Figure 9:
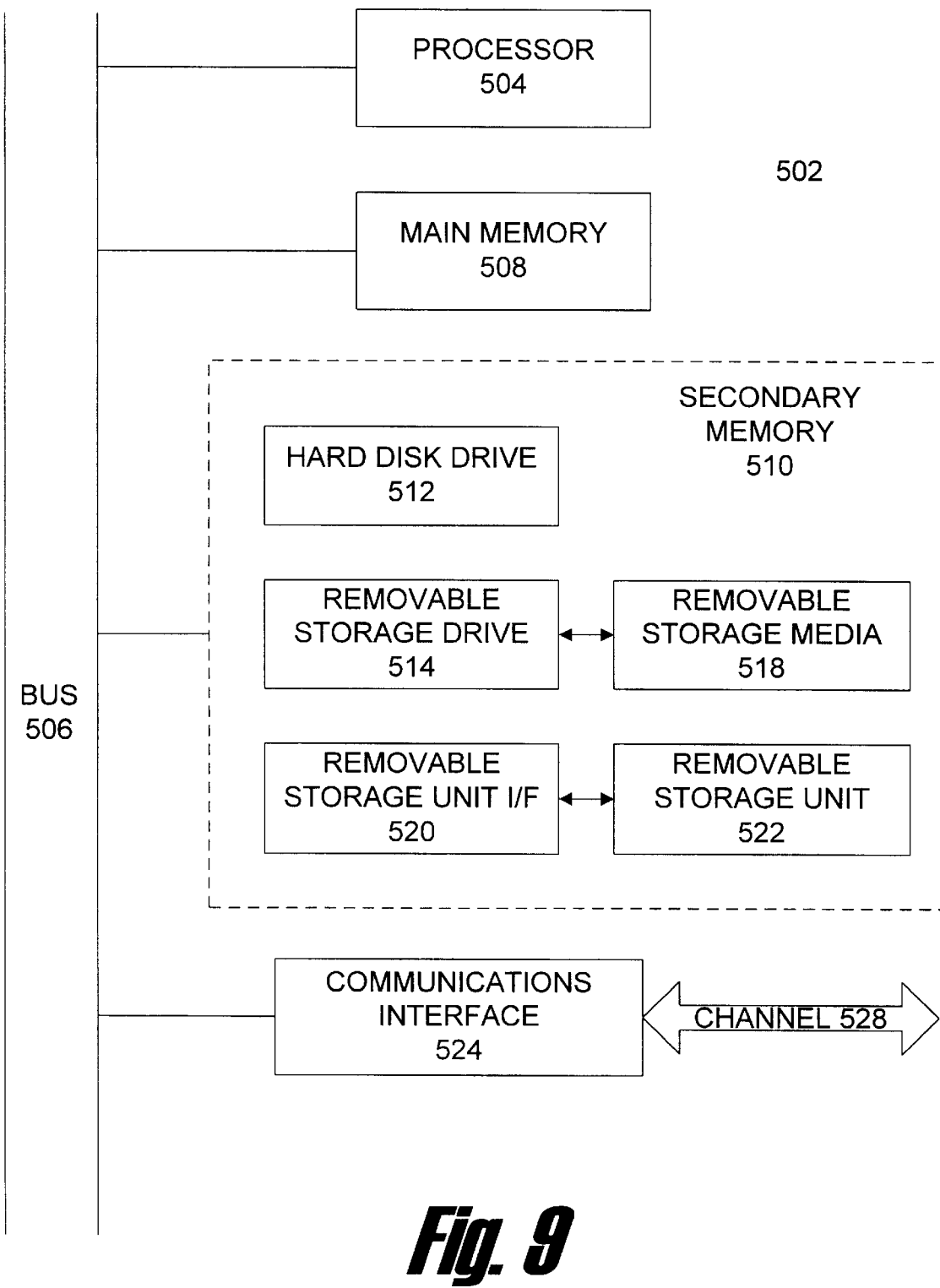
FIG. 9 is a block diagram illustrating an example processor-based system according to one embodiment of the invention.

The various embodiments, aspects and features of the invention described above may be implemented using hardware, software or a combination thereof and may be implemented using a computing system having one or more processors. In fact, in one embodiment, these elements are implemented using a processor-based system capable of carrying out the functionality described with respect thereto. An example processor-based system 502 is shown in FIG. 9 according to one embodiment of the invention. The computer system 502 includes one or more processors, such as processor 504. The processor 504 is connected to a communication bus 506. Various software embodiments are described in terms of this example computer system. The embodiments, features and functionality of the invention as described above are not dependent on a particular computer system or processor architecture or on a particular operating system. In fact, after reading this document, it will become apparent to a person of ordinary skill in the relevant art how to implement the invention using other computer or processor systems and/or architectures.

Processor-based system 502 can include a main memory 508, preferably random access memory (RAM), and can also include a secondary memory 510. The secondary memory 510 can include, for example, a hard disk drive 512 and/or a removable storage drive 514, representing a floppy disk drive, a magnetic tape drive, an optical disk drive, etc. The removable storage drive 514 reads from and/or writes to a removable storage medium 518 in a well known manner. Removable storage media 518, represents a floppy disk, magnetic tape, optical disk, etc. which is read by and written to by removable storage drive 514. As will be appreciated, the removable storage media 518 includes a computer usable storage medium having stored therein computer software and/or data.

In alternative embodiments, secondary memory 510 may include other similar means for allowing computer programs or other instructions to be loaded into computer system 502. Such means can include, for example, a removable storage unit 522 and an interface 520. Examples of such can include a program cartridge and cartridge interface (such as that found in video game devices), a removable memory chip (such as an EPROM, or PROM) and associated socket, and other removable storage units 522 and interfaces 520 which allow software and data to be transferred from the removable storage unit 518 to computer system 502.

Computer system 502 can also include a communications interface 524. Communications interface 524 allows software and data to be transferred between computer system 502 and external devices. Examples of communications interface 524 can include a modem, a network interface (such as, for example, an Ethernet card), a communications port, a PCMCIA slot and card, etc. Software and data transferred via communications interface 524 are in the form of signals which can be electronic, electromagnetic, optical or other signals capable of being received by communications interface 524. These signals are provided to communications interface via a channel 528. This channel 528 carries signals and can be implemented using a wireless medium, wire or cable, fiber optics, or other communications medium. Some examples of a channel can include a phone line, a cellular phone link, an RF link, a network interface, and other communications channels.

In this document, the terms "computer program medium" and "computer usable medium" are used to generally refer to media such as removable storage device 518, a disk capable of installation in disk drive 512, and signals on channel 528. These computer program products are means for providing software or program instructions to computer system 502.

Computer programs (also called computer control logic) are stored in main memory 508 and/or secondary memory 510. Computer programs can also be received via communications interface 524. Such computer programs, when executed, enable the computer system 502 to perform the features of the present invention as discussed herein. In particular, the computer programs, when executed, enable the processor 504 to perform the features of the present invention. Accordingly, such computer programs represent controllers of the computer system 502.

In an embodiment where the elements are implemented using software, the software may be stored in, or transmitted via, a computer program product and loaded into computer system 502 using removable storage drive 514, hard drive 512 or communications interface 524. The control logic (software), when executed by the processor 504, causes the processor 504 to perform the functions of the invention as described herein.

In another embodiment, the elements are implemented primarily in hardware using, for example, hardware components such as PALs, application specific integrated circuits (ASICs) or other hardware components. Implementation of a hardware state machine so as to perform the functions described herein will be apparent to persons skilled in the relevant art(s). In yet another embodiment, elements are implemented using a combination of both hardware and software.

In an embodiment where the elements are implemented using software, the software may be stored in, or transmitted via, a computer program product and loaded into computer system 502 using removable storage drive 514, hard drive 512 or communications interface 524. The control logic (software), when executed by the processor 504, causes the processor 504 to perform the functions of the invention as described herein.

Figure 10:
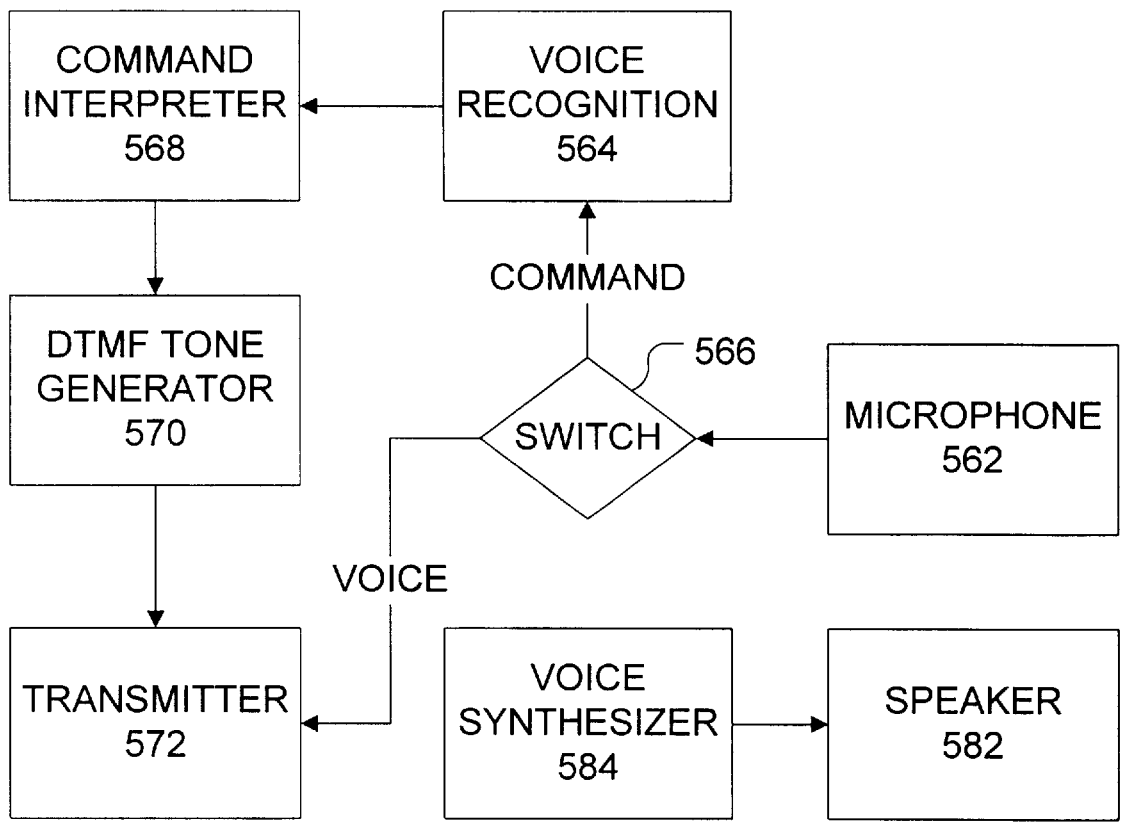
FIG. 10 is a block diagram generally illustrating functionality that can be used to implement one or more aspects of the voice command mode according to one embodiment of the invention.

FIG. 10 is a block diagram and generally illustrating functionality which can be used to implement one or more aspects of the voice command mode according to one embodiment of the invention. Referring now to FIG. 10, the system includes a microphone 562 configured to receive audible information such as, for example, conversational voice or voice commands from a user of the communication device. In one embodiment, microphone 562 can convert the audible signal into an electrical signal representing the audible signal.

Where the audible signal is received and the communication device is not in the voice command mode, the audio information can be forwarded to a transmitter 572 for communication to the other party. If, on the other hand, the communication device is in a voice command mode, the electrical signals representing the audio information are provided to a voice recognition unit 564.

A switch 566 can be provided to control entry of the communication device is into and out of the voice command mode. When in the voice command mode, voice recognition unit 564 can be activated and the voice masked from being transmitted to the other parties. The switch 566 can be implemented using hardware, software, or a combination thereof. As indicated in the example embodiments described above, the switch can be a manual switch, or can be a software switch triggered by the occurrence of predetermined or programmed events.

Voice recognition unit 564 can comprise hardware, software, or a combination thereof. In fact, there are numerous products on the market that can be used to implement a voice recognition functionality in accordance with the features and aspects of the invention disclosed herein. Also included is a command interpreter configured to interpret the received and recognized commands. Preferably, in one embodiment, voice recognition and command interpretation are performed using a combination of hardware and software. More specifically, in one embodiment, speech recognition and command interpretation and can be implemented using software executed by a processor such as, for example, processor 104 of the example application.

Where the command instructs the communication device to generate and transmit DTMF tones, a DTMF tone generator 570 is provided. As with the command interpreter 568 and the voice recognition unit 564, DTMF tone generator 570 can be implemented using hardware or software, or a combination thereof, and can also be operated under the control of a processor such as, for example, processor 104 of the example application.

As illustrated in FIG. 10, the generated DTMF tones are provided to transmitter 572 for transmission to the other party. For example, consider a scenario where the user utilizes the communication device to access an automated phone system such as, for example, a voice mail system. In this embodiment, when accessing a voice command mode, microphone 562 receives the spoken command, and converts it to electrical signals. The electrical signals are interpreted by voice recognition unit 564 as, for example, spoken words. The voice (e.g., the spoken words) are read and interpreted by command interpreter 568. Because in the example scenario the user is commanding the phone to generate DTMF tones, DTMF tone generator 570 generates the tones corresponding to the spoken commands and provides these to transmitter 572 for transmission (e.g., via a telephone line) to the recipient, a voice mail system.

As stated above, a voice synthesizer 584 can be included with a communication device to provide voice or "open" information via a speaker 582 to the user. For example, in one scenario the communication device can use voiced synthesizer 584 to "say" the identity of an incoming caller when a call is received. As with the other functionality described herein, voice synthesizer 584 can be implemented using hardware, software, or a combination of the above, and can be operated under the control of processor 104.

Although not illustrated, signal conditioning, amplification and other signal processing functions can be performed in sending signals and information among various components of the communication handset.

4. Conclusion

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

We claim:

1. A method for enabling a communication device having a communication handset to allow voice-controlled interaction with a voice mail system or other telephonic system, the method comprising:

entering a voice command mode;

receiving audible information from a user of the communication device in the voice command mode, wherein said audible information comprises speech indicating a key sequence to be entered in accessing said system and wherein said key sequence is used to allow the user to navigate in said telephonic system;

interpreting said received audible information as a voice command instructing the communication handset to dial said requested key sequence entry;

dialing said requested key sequence entry; and exiting said voice command mode, wherein exiting said voice command mode is performed in response the occurrence of the expiration of a time period, passing of a period of silence, or completion of a recognized command or command sequence.

2. The method of claim 1, wherein said entering a voice command mode is performed in response to a manual operation performed by said user or in response to the occurrence of one or more programmed events.

3. The method of claim 2, wherein said programmed events comprise at least one of the group of dialing an identified number, receiving a call from an identified calling number, or receiving an incoming call in an idle mode.

4. The method of claim 1, wherein said interpreting comprises employing speech recognition techniques to interpret a received voice command to determine a key or key sequence the user is instructing the communication handset to dial.

5. The method of claim 1, wherein said recognized command or command sequence comprises a voice-mail message reply or forward command.

6. The method of claim 1, wherein said dialing comprises generating one or more DTMF tones and transmitting said generated tone or tones to said system.

7. The method of claim 1, wherein said dialing comprises generating and transmitting a signal representing the requested key or key sequence, whereby said signal is capable of being converted into DTMF tones prior to delivery to an end user or prior to delivery to a public-switched telephone network.

8. The method of claim 1, wherein said key sequence comprises a sequence of one or more keypad entries used in accessing or navigating within the telephonic system.

9. A method for enabling a communication handset to accept voice commands from a user for instructing the communication handset to generate and transmit one or more DTMF tones, the method comprising:

entering a voice command mode;

receiving audible information from the user in the voice command mode, wherein said audible information comprises speech indicating a key or key sequence the user desires to enter;

interpreting said received audible information as a voice command instructing the communication handset to dial an appropriate key or key sequence corresponding to the command;

generating one or more DTMF tones to dial said appropriate key or key sequence;

transmitting said one or more DTMF tones to a recipient party; and exiting said voice command mode automatically after a predetermined amount of time.

10. The method of claim 9, wherein said entering a voice command mode is performed in response to a manual operation performed by said user.

11. The method of claim 10, wherein said manual operation comprises a key stroke or keypad entry.

12. The method of claim 9, wherein said entering a voice command mode is performed in response to the occurrence of one or more programmed events.

13. The method of claim 12, wherein said programmed events can be user programmed.

14. The method of claim 12, wherein said programmed events comprise at least one of the group of dialing an identified number, receiving a call from an identified calling number, or receiving an incoming call in an idle mode.

15. The method of claim 9, wherein said interpreting comprises employing speech recognition techniques to interpret a received voice command to determine a key or key sequence the user is instructing the communication handset to dial.

16. The method of claim 9, wherein generating and transmitting one or more DTMF tones comprises generating and transmitting dual-tone-multi-frequency tones or generating and transmitting electrical signals representing a key or key sequence, whereby said electrical signals are capable of being converted into DTMF tones prior to delivery to an end user or prior to delivery to a public-switched telephone network.

17. A system for accepting voice commands at a communication device having a communication handset, comprising:

a switch configured to cause said communication device to enter a mode in which said communication device accepts voice commands;

a microphone configured to receive audible information from a user of the communication device, wherein said audible information comprises speech indicating a command to be carried out by said communication device;

a speech interpreter configured to interpret said received audible information as a voice command, said voice command to be carried out by said communication handset;

wherein said voice command includes adjustment of the volume of the handset.

18. The system of claim 17, wherein said switch comprises a manual switch or a software switch.

19. The system of claim 18, wherein said software switch is configured to place said communication device into said mode in response to the occurrence of one or more events.

20. The system of claim 19, wherein said programmed events comprise at least one of the group of dialing an identified number, receiving a call from an identified calling number, or receiving an incoming call in an idle mode.

21. The system of claim 17, wherein said speech interpreter comprises a speech recognition system and a command interpreter configured to interpret a received voice command to determine an action that the user is instructing the communication handset to carry out.

22. The system of claim 17, further comprising a switch configured to cause said communication device to exit said voice command mode, wherein said switch comprises a manual switch or a programmable switch.

23. The system of claim 22 wherein said software switch operates in response to the occurrence of one or more programmed events, and wherein said programmed events comprise at least one of the group of expiration of a time period, passing of a period of silence, or completion of a recognized command or command sequence.

24. The system of claim 23, wherein said recognized command or command sequence comprises one or more commands instructing the handset to dial a requested key or sequence, or instructing the handset to perform one or more functions.

25. The system of claim 24, wherein dialing comprises generating one or more DTMF tones and transmitting said generated tone or tones to said system or generating and transmitting a signal representing the requested key or key sequence, whereby said signal is capable of being converted into DTMF tones prior to delivery to an end user or prior to delivery to a public-switched telephone network.

26. The system of claim 24, wherein said one or more functions comprise at least one of adjusting a volume of said communication device, accessing a directory of said communication device, answering an incoming call, and ignoring an incoming call.

27. A system for accepting voice commands at a communication device having a communication handset, comprising:

a software switch for causing said communication device to enter a voice command mode in which said communication device accepts voice commands;

means for receiving audible information from a user of the communication device, wherein said audible information comprises speech indicating a command to be carried out by said communication device;

means for interpreting said received audible information as a voice command, said voice command to be carried out by said communication handset;

wherein said communication device is configured to automatically place said communication device into said voice command mode upon the initiation of a call to a particular recipient.

28. The system of claim 27, wherein said means for interpreting comprises a speech recognition means and an interpretation means for interpreting a received voice command and determining an action that the user is instructing the communication handset to carry out.

29. The system of claim 27, further comprising means for causing said communication device to exit said voice command mode, comprising a manual switch or a programmable switch.

30. The system of claim 29 wherein said programmable switch operates in response to the occurrence of one or more programmed events, and wherein said programmed events comprise at least one of the group of expiration of a time period, passing of a period of silence, or completion of a recognized command or command sequence.

31. The system of claim 30, wherein said recognized command or command sequence comprises one or more commands instructing the handset to dial a requested key or sequence, or instructing the handset to perform one or more functions.

32. The system of claim 31, wherein dialing comprises generating one or more DTMF tones and transmitting said generated tone or tones to said system or generating and transmitting a signal representing the requested key or key sequence, whereby said signal is capable of being converted into DTMF tones prior to delivery to an end user or prior to delivery to a public-switched telephone network.

33. The system of claim 31, wherein said one or more functions comprise at least one of adjusting a volume of said communication device, accessing a directory of said communication device, answering an incoming call, and ignoring an incoming call.

34. A computer program product comprising a computer useable medium having computer program logic recorded thereon for enabling a communication handset to accept voice commands, said computer program logic comprising:

computer program code logic configured to cause said communication handset to enter a mode in which said communication handset accepts voice commands;

computer program code logic configured to allow said communication handset to receive audible information from a user of the communication handset, wherein said audible information comprises speech indicating a command to be carried out by said communication handset, wherein said command is to provide an identification of a caller placing an incoming call;

computer program code logic configured to cause said communication handset to interpret said received audible information as a voice command, said voice command to be carried out by said communication handset.

35. The computer program product of claim 34, wherein said computer program code logic configured to cause said communication device to enter a mode comprises a manual switch or a software switch.

36. The computer program product of claim 35, wherein said software switch is configured to place said communication device into said mode in response to the occurrence of one or more events.

37. The computer program product of claim 36, wherein said programmed events comprise at least one of the group of dialing an identified number, receiving a call from an identified calling number, or receiving an incoming call in an idle mode.

38. The computer program product of claim 34, wherein computer program code logic configured to cause said communication device to interpret comprises a speech recognition means and an interpretation means for interpreting a received voice command and determining an action that the user is instructing the communication handset to carry out.

39. The computer program product of claim 34, further comprising computer program code logic configured to cause said communication device to exit said voice command mode, in response to a manual switch or a programmable switch.

40. The computer program product of claim 39 wherein said programmable switch operates in response to the occurrence of one or more programmed events, and wherein said programmed events comprise at least one of the group of expiration of a time period, passing of a period of silence, or completion of a recognized command or command sequence.

41. The computer program product of claim 40, wherein said recognized command or command sequence comprises one or more commands instructing the handset to dial a requested key or sequence, or instructing the handset to perform one or more functions.

42. The computer program product of claim 41, wherein dialing comprises generating one or more DTMF tones and transmitting said generated tone or tones to said computer program product or generating and transmitting a signal representing the requested key or key sequence, whereby said signal is capable of being converted into DTMF tones prior to delivery to an end user or prior to delivery to a public-switched telephone network.

43. The computer program product of claim 41, wherein said one or more functions comprise at least one of adjusting a volume of said communication device, accessing a directory of said communication device, answering an incoming call, and ignoring an incoming call.

44. A voice-controllable communications handset, comprising:

a microphone;
a speaker;
a keypad;
a processor; and computer software executable by said processor and including computer program code means, said computer program code means comprising:

computer program code logic configured to cause said communication handset to enter a mode in which said communication handset accepts voice commands;

computer program code logic configured to allow said communication handset to receive audible information from a user of the communication handset, wherein said audible information comprises speech indicating a command to be carried out by said communication handset;

computer program code logic configured to cause said communication handset to interpret said received audible information as a voice command, said voice command to be carried out by said communication handset; and computer program code logic configured to cause said communication device to exit said voice command mode in response to the occurrence of one or more programmed events comprising at least one of the group of expiration of a time period, passing of a period of silence, or completion of a recognized command or command sequence.

45. The computer program product of claim 44, wherein said computer program code logic configured to cause said communication device to enter a mode comprises a manual switch or a software switch.

46. The computer program product of claim 45, wherein said software switch is configured to place said communication device into said mode in response to the occurrence of one or more events.

47. The computer program product of claim 46, wherein said programmed events comprise at least one of the group of dialing an identified number, receiving a call from an identified calling number, or receiving an incoming call in an idle mode.

48. The computer program product of claim 44, wherein computer program code logic configured to cause said communication device to interpret comprises a speech recognition means and an interpretation means for interpreting a received voice command and determining an action that the user is instructing the communication handset to carry out.

49. The computer program product of claim 44, wherein said recognized command or command sequence comprises one or more commands instructing the handset to dial a requested key or sequence, or instructing the handset to perform one or more functions.

50. The computer program product of claim 49, wherein dialing comprises generating one or more DTMF tones and transmitting said generated tone or tones to said computer program product or generating and transmitting a signal representing the requested key or key sequence, whereby said signal is capable of being converted into DTMF tones prior to delivery to an end user or prior to delivery to a public-switched telephone network.

* * * * *